J. STEVENS.

Stóp-Cocks.

No. 5,790. Reissued March 10. 1874.

Witnesses

Chas. Raettig.

Joseph H. Berlin.

Inventor:

John Stevens by

A. v. Briesen his attorney

UNITED STATES PATENT OFFICE.

JOHN STEVENS, OF NEW YORK, N. Y., ASSIGNOR TO JOSEPH H. DEVLIN.

IMPROVEMENT IN STOP-COCKS.

Specification forming part of Letters Patent No. 130,876, dated August 27, 1872; reissue No. 5,790, dated March 10, 1874; application filed January 12, 1874.

*To all whom it may concern:*

Figure 1:
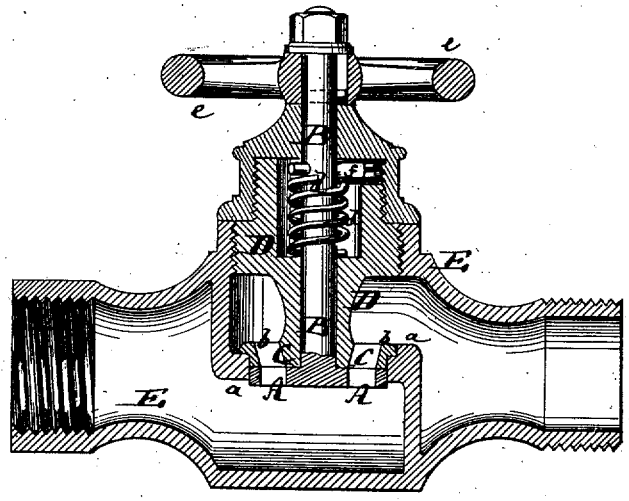
Figure 2:
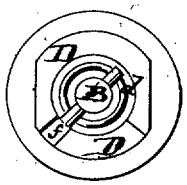
Figure 3:
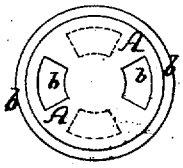

Be it known that I, JOHN STEVENS, of New York, N. Y., have invented a new and Improved Valve or Stop-Cock, of which the following is a specification:

Figure 1 is a vertical longitudinal section of my improved valve or stop-cock. Fig. 2 is a top view of the same, the handle and cap being removed. Fig. 3 is a bottom view of the valve.

Similar letters of reference indicate corresponding parts in all the figures.

This invention relates to a new arrangement of valve or stop-cock, and of the seat for the same; and consists principally in fitting the valve-stem through an inwardly-projecting tube, against the end of which the valve-disk is caused to bear, so that such tube will form the valve-seat, and cause the parts to fit tight without necessitating the use of a packing or stuffing box. The invention also consists in forming a perforated flange on the above-mentioned tube, and in causing the valve-disk to bear against the same, so that the valve-disk will be open when the perforations in it are in line with those of the flange, and closed when the perforations are out of line.

In the drawing, the letter A represents a valve-disk mounted upon a stem, B. C is the valve-seat, formed at the end of a tube or bonnet, D, that is fitted into and firmly secured to the shell or pipe E, within which the valve-disk is applied. The drawing represents the shell or pipe E to have a perforated partition, as usual. The valve-stem B passes through the inwardly-projecting tube or bonnet D, and the valve-disk A may, by a spring, *d*, be drawn against the inner end of the tube or bonnet. By this means the valve-disk A is held tight against its seat, and leakage along the valve-stem is practically prevented, especially when the contiguous faces of the valve-disk A and tube D are ground smooth, the use of a packing or stuffing box around the stem being thus dispensed with. The inner end of the bonnet or tube D is shown to be enlarged, to form a flange, *b*, that bears firmly against the partition *a*. The enlargement or flange *b* on the inner end of the tube D is perforated, and so is also part of the valve-disk A, so that in a pipe, E, a short turn of the valve-disk will bring the perforations in line, while another short turn will bring them out of line, thus opening or closing the perforations in *b* with convenience. For facilitating the turning of the valve-disk, a hand-wheel, *e*, or handle is applied to the upper end of the stem. A stop-pin, *f*, will confine the motions of the valve-disk within the required limits.

I claim as my invention—

1. The combination of the valve-stem B and valve-disk A with the inwardly-projecting tube or bonnet D, against the end of which the disk is caused to bear, and with the shell or pipe E, substantially as and for the purpose herein shown and described.

2. The flange *b* on the tube D, combined with the valve-disk A, stem B, and spring *d*, and with the shell or pipe E, substantially as herein shown and described.

3. In a stop-cock provided with a shell, E, and perforated partition *a*, the combination of the bonnet D, perforated flange *b*, stem B, and valve-disk A, arranged and operating as specified.

JOHN STEVENS.

Witnesses:
GEORGE J. CAVE,
CHAS. RAETTIG.